UNITED STATES PATENT OFFICE.

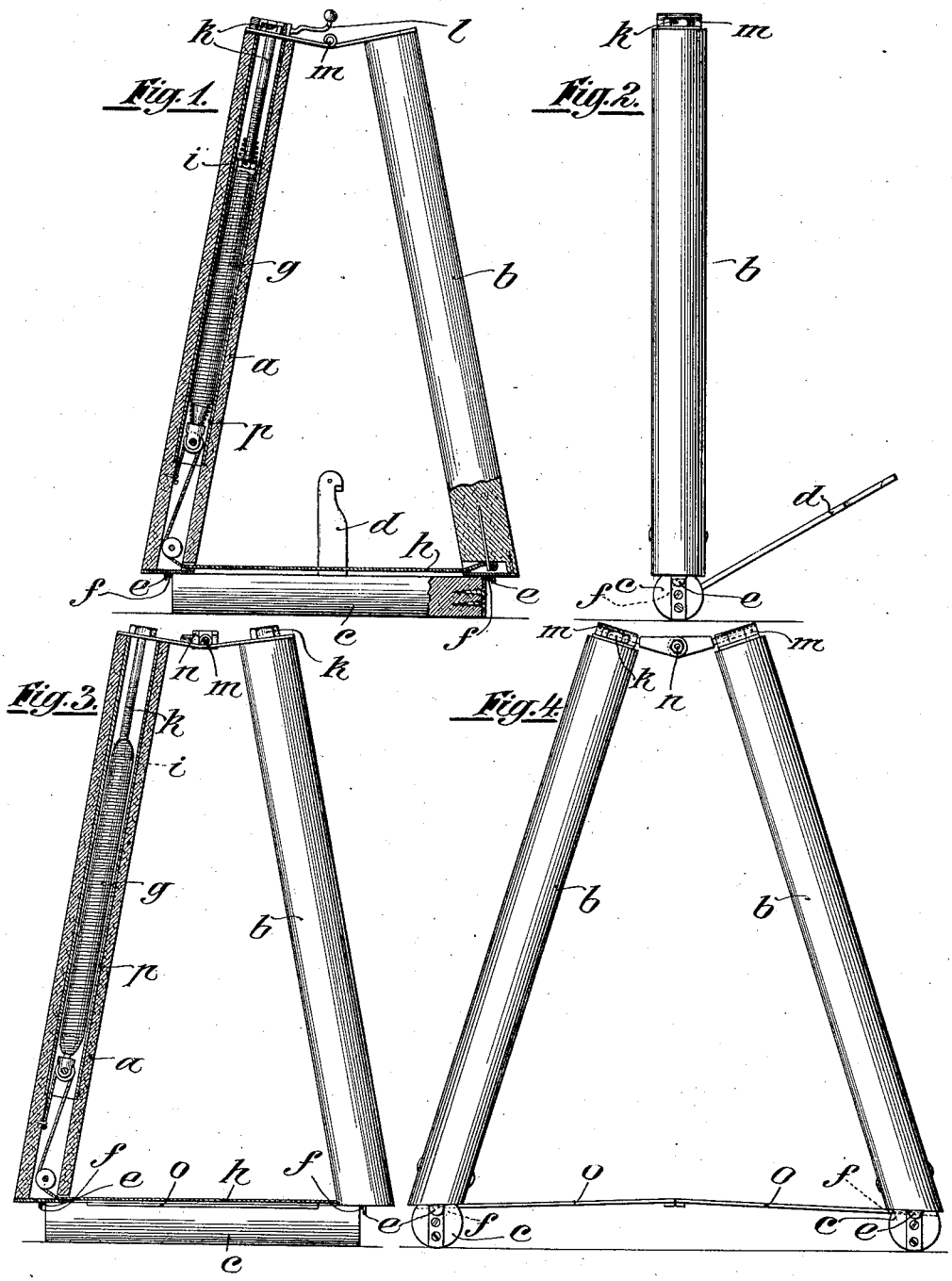

JOSEPH ANTON SAUTER, OF SCHWAIGERN, GERMANY.

RABBIT-TRAP.

1,079,666.　　　　Specification of Letters Patent.　　Patented Nov. 25, 1913.

Application filed July 31, 1913. Serial No. 782,195.

*To all whom it may concern:*

Be it known that I, JOSEPH ANTON SAUTER, a citizen of the German Empire, residing at Schwaigern, in the Kingdom of Württemberg, Empire of Germany, have invented certain new and useful Improvements in Rabbit-Traps, of which the following is a specification.

The object of this present invention is a trap for rabbits or other animals, which serves for catching all sorts of animals and consists of two jamming beams, which have their tops joined hinge-like and under spring pressure, while their lower ends are kept asunder by an easily disengaging prop or beam, on which the bait is deposited.

The characteristics of this invention will be in the avoidance, as far as possible, of any protruding parts of iron or other metals, which the animals notoriously scent in a moment, with the result, that they avoid the traps. For this reason the present trap consists principally of wood and the spring which bends and closes the trap, is adjustable within the hollow part of one of the jamming beams and connected by a pulling rope with the lower end of the other jamming beams.

On the accompanying drawing the object of this invention is explained by two examples of its construction.

Figures 1 and 2 show the trap as a so-called plain trap by means of a partial frontal and sectional view, while the Figs. 3 and 4 represent a modified form of the trap by a partial frontal and sectional view.

According to Figs. 1 and 2 the trap (plain trap) consists of two wooden rods $a$ and $b$, which at their upper ends are loosely jointed, as usual, while the lower ends of said rods $a$ and $b$ are connected by a cross-rod $c$ of wood, which at the same time is provided with a wooden arm on which the bait is fixed. Each of the rods $a$ and $b$ has upon its lower face a short supporting peg $e$ and the rod $c$ has at both ends a peg $f$ by which it can be inserted tight between the pegs $e$ of the rods $a$, $b$ (Fig. 1). For the purpose of setting and closing the trap one of the rods $a$, $b$, as for instance $a$ is hollow, with a powerful spring $g$ inside, one end of which is connected by a rope $h$ with the other rod $b$, while the other end of the spring is connected with a worm $k$ by means of a fixed nut $i$. This worm can be turned from the outside with a key $l$ or the like if the tension of the spring $g$ requires varying.

According to Figs. 3 and 4 the modified form of trap consists of two pairs of rods $a$, $b$, $c$, the rods $a$, $b$ on the one hand being interlocked by a joint $m$, while they are on the other hand coupled by an additional joint $n$. Here each of the two rods $a$, $(c)$ is provided with the customary running board $e$ which boards meet halfway between the pair of rods $a$ $b$, when the trap is set up. The spring $g$ is in both cases suitably inclosed in a metal casing $p$ in order to prevent its being influenced in its operation by the instabilty of the wood, due to the action of the weather. It goes without saying, that in lieu of one spring $g$ only, such a spring may be inserted in each of the wooden rods $a$ $b$ according to the size in which the trap is constructed and for which kind of animals it is intended.

The operation of the trap is as follows: When setting up the trap the rods $a$ $b$ are to be stretched out with a securing rod adjusted between, to prevent their accidental collapse, whereupon the rod $(c)$ with its pegs $f$ is inserted between the pegs $e$ of the rods $a$, $b$ and the securing rod removed. In this manner the spring $g$ and the rope $h$ are stretched. In the case of a plain trap according to Figs. 1 and 2 a bait is affixed to the arm $d$ which may be dispensed with in the case of the modified form of trap, as shown by Figs. 3 and 4. When set up the trap is placed in a suitable part of the farm or dwelling and its hardly visible metallic portions well covered with sheaves, leaves or such like. If using the modified form of trap (Figs. 3 and 4) it will be requisite to cover up both sides as well, so that the animals can enter it only from behind or in front. As soon as an animal pulls at the bait or walks over the boards $c$, it will cause a separation of the pegs $f$ of the rod $c$ from the pegs $e$ of the rods $a$ $b$, which are supporting each other but slightly. The result will be, that the spring $g$ contracts immediately, pulling at the rope $h$, whereby the rods $a$ $b$ are made to dash together with the neck of the animal between them. The latter will find it impossible to liberate itself, as it cannot separate the rods $a$ $b$ but the tension of the spring $g$ can be adjusted in such a manner, that the animals are not much injured or in other words the tension may be reduced, when intending to catch smaller animals, below the standard which would be required for larger and stronger ones, so that full scope is given to humane considerations.

What I claim and desire to secure by Letters Patent is:

1. In a trap, in combination, two rods hinged to one another at their upper ends, one of said rods being hollow, a spring within said hollow rod, a cord secured to said spring and to the lower end of the other of said rods, and disengageable bait receiving means for holding the lower ends of said rods apart against the action of said spring.

2. In a trap, in combination, two rods hinged to one another at their upper ends, one of said rods being hollow, a spring within said hollow rod, means for adjusting the tension of said spring, a cord secured to said spring and to the lower end of the other of said rods, and disengageable bait receiving means for holding the lower ends of said rods apart against the action of said spring.

In testimony whereof I affix my signature in presence of two witnesses.

JOSEPH ANTON SAUTER.

Witnesses:
JEAN GULDEN,
PAULINE MÜLLER.

Copies of this patent may be obtained for five cents each, by addressing the "Commissioner of Patents, Washington, D. C."